US012714190B2

(12) United States Patent
Giandolini et al.

(10) Patent No.: US 12,714,190 B2
(45) Date of Patent: Aug. 25, 2026

(54) SHOE SOLE

(71) Applicant: SALOMON S.A.S., Epagny Metz-Tessy (FR)

(72) Inventors: Marlène Giandolini, Thorens-Glières (FR); Laurent Coudurier, Cran Gevrier Annecy (FR); Lionel Favret, Annecy (FR)

(73) Assignee: SALOMON S.A.S., Epagny Metz-Tessy (FR)

( * ) Notice: Subject to any disclaimer, the term of this patent is extended or adjusted under 35 U.S.C. 154(b) by 3 days.

(21) Appl. No.: 18/377,565

(22) Filed: Oct. 6, 2023

(65) Prior Publication Data

US 2024/0114998 A1 Apr. 11, 2024

(30) Foreign Application Priority Data

Oct. 7, 2022 (FR) ................................ FR2210270

(51) Int. Cl.
*A43B 13/12* (2006.01)
*A43B 5/06* (2022.01)
(Continued)

(52) U.S. Cl.
CPC ............... *A43B 13/18* (2013.01); *A43B 5/06* (2013.01); *A43B 13/127* (2013.01); *A43B 13/145* (2013.01); *B32B 5/18* (2013.01); *B32B 7/022* (2019.01); *B32B 27/065* (2013.01); *B32B 2274/00* (2013.01); *B32B 2307/54* (2013.01);
(Continued)

(58) Field of Classification Search
CPC ....... A43B 7/24; A43B 13/127; A43B 13/145; A43B 13/186
See application file for complete search history.

(56) References Cited

U.S. PATENT DOCUMENTS 6,321,469 B1 * 11/2001 Cretinon ............... A43B 13/12 36/102
6,625,905 B2 * 9/2003 Kita ..................... A43B 13/12 36/28
(Continued)

FOREIGN PATENT DOCUMENTS

WO WO2017/058420 A1 4/2017

OTHER PUBLICATIONS

French Search Report issued in French Patent Application No. FR2210270, dated Apr. 27, 2023.
(Continued)

*Primary Examiner* — Sharon M Prange
(74) *Attorney, Agent, or Firm* — GREENBLUM & BERNSTEIN, P.L.C.

(57) ABSTRACT

Outer sole assembly of a shoe having a rigid blade, having a modulus of elasticity greater than 750 MPa, inserted between an upper cushioning layer and a lower cushioning layer. The external sole assembly includes a rigid support, having a modulus of elasticity greater than 100 MPa, including: a lower bridge extending substantially over the entire width of the upper cushioning layer in the area of at least one transverse segment of a central zone; and a lateral wing covering a portion of the lateral surface of the upper cushioning layer, the cover portion covering at least one strip having a width of at least ten millimeters, the strip extending lengthwise towards the rear, from the lower bridge.

23 Claims, 12 Drawing Sheets

(51) Int. Cl.

| | |
|---|---|
| ***A43B 13/14*** | (2006.01) |
| ***A43B 13/18*** | (2006.01) |
| ***B32B 5/18*** | (2006.01) |
| ***B32B 7/022*** | (2019.01) |
| ***B32B 27/06*** | (2006.01) |

(52) U.S. Cl.

CPC . *B32B 2307/554* (2013.01); *B32B 2307/7375* (2023.05); *B32B 2437/02* (2013.01)

(56) References Cited

U.S. PATENT DOCUMENTS

| | | | | |
|---|---|---|---|---|
| 7,096,605 | B1 * | 8/2006 | Kozo | A43B 7/26 36/76 R |
| 7,299,567 | B2 * | 11/2007 | Berend | A43B 23/087 36/108 |
| 8,196,318 | B2 * | 6/2012 | Kosta | A43B 7/16 36/108 |
| 8,365,440 | B2 * | 2/2013 | Rivas | A43B 7/18 36/107 |
| 8,453,344 | B2 * | 6/2013 | Nishiwaki | A43B 13/127 36/35 R |
| 10,588,378 | B2 * | 3/2020 | Groeneweg | A43B 23/227 |
| 11,470,912 | B2 * | 10/2022 | Hatano | A43B 13/141 |
| 11,478,039 | B2 * | 10/2022 | Paulson | A43B 13/026 |
| 2004/0111920 | A1 * | 6/2004 | Cretinon | A43B 13/141 36/30 R |
| 2004/0154188 | A1 * | 8/2004 | Laska | A43B 13/186 36/31 |
| 2017/0079373 | A1 | 3/2017 | Huard et al. | |

OTHER PUBLICATIONS

Written Opinion issued in French Patent Application No. FR2210270, dated Apr. 27, 2023.

* cited by examiner 1
3311R
3310
33R
331D
3311
33D
331U
334
33U
3331
33221
332
33
331
3332
334
3
2
32
31
L33
L2
3311F
33F

[Fig. 8]

SHOE SOLE

CROSS-REFERENCE TO RELATED APPLICATION

This application is based upon French Patent Application No. FR 2210270, filed Oct. 7, 2022, the disclosure of which is hereby incorporated by reference thereto in its entirety, and the priority of which is claimed under 35 U.S.C. § 119.

BACKGROUND

1. Field of the Invention

The present invention relates to a sports shoe sole.

The invention aims to provide a sole structure for optimizing the deformation of the sole on impact, and for improving the rolling movement of the foot on the ground as well as propulsion. One of the characteristics of the sole having an impact on these objectives is its resilience, i.e., its ability to absorb and release energy. Resilience corresponds to the ratio between the energy released and the energy applied to the material. It characterizes the "rebound" of the shoe, its ability to restore energy to facilitate propulsion. Also notable is the fact that increasing the resilience of the sole-forming material makes it possible to improve running economy, i.e., the amount of oxygen consumed by the runner per unit of distance, the main performance criterion in road running. The resilience of the sole depends on the type of the materials used, the geometry of its components, as well as the arrangement of the various constituent components.

2. Background Information

A plurality of documents, such as Patent Publication No. WO2017/058420, describe soles incorporating a rigid plate associated with one or more cushioning layers. The rigid plate generally extends over the entire length of the sole. This plate proves to be an effective component for improving running economy as it stiffens the sole in the area of the metatarsals, thus limiting their flexion and, therefore, the loss of energy generated during flexion of the metatarsophalangeal joint. However, the presence of a rigid plate in the area of the heel reduces the cushioning on impact (for heel strike running).

SUMMARY

The invention provides an improved shoe sole.

The invention also provides a sole optimizing the deformation of the material on heel impact in order to increase resilience.

The invention further provides a sole for accelerating the rolling motion of the foot on the ground during the transition phase between impact and propulsion.

Still further, the invention provides a sole having good lateral stability/cushioning, particularly during impact (heel strike phase).

The invention provides an outer sole assembly of a shoe comprising an upper cushioning layer comprising a surface interfacing with an upper of the shoe, the interface surface extending over a length of the upper, between a front end and a rear end, the outer sole assembly comprising a rigid blade, having a modulus of elasticity greater than 750 MPa, interposed between the upper cushioning layer and a lower cushioning layer, the rigid blade being arranged at least partially in a front half of the outer sole assembly.

The outer sole assembly is characterized in that it comprises a rigid support, having a modulus of elasticity greater than 100 MPa, comprising:

- a lower bridge covering a portion of the lower surface of the upper cushioning layer, the lower bridge extending substantially over the entire width of this upper cushioning layer in the area of at least one transverse segment of a central zone located between 30% and 50% of the length of the upper, from the rear end of the interface surface,
- a lateral wing covering a portion of the lateral surface of the upper cushioning layer, the cover portion covering at least one strip having a width of at least ten millimeters, this strip extending lengthwise towards the rear, from the lower bridge to at least one front plane of the outer sole assembly spaced away from the rear end of the interface surface by 20% of the length of the upper.

As indicated above, the rigid blade in the area of the front portion of the outer sole assembly enables running economy due to the fact that it stiffens the sole in the area of the metatarsals, then limiting their flexion and, therefore, the loss of energy generated during flexion of the metatarsophalangeal joint. To further energize the stride, the outer sole assembly comprises a rigid support provided with a lateral wing which contains the lateral expansion of the upper cushioning layer, in the area of the heel. The cushioning layer is then constrained on impact, at the time of the heel strike phase, thereby improving the resilience of the sole in the area of the heel. This limits the loss of energy at the time of impact. The sole being more resilient results in a greater rebound effect which helps with propulsion, accelerating the shift to front support, in the area of the metatarsals. The combination of the rigid blade with the rigid support makes it possible to improve the rolling motion of the foot on the ground as well as propulsion. In addition, limiting the crushing of the sole in the area of the heel reduces the lateral movements of the sole, thereby providing a little more lateral stability.

According to advantageous but non-essential aspects of the invention, such a shoe outer sole assembly may incorporate one or more of the following characteristics, taken in any technically acceptable combination:

- The rigid support comprises a medial wing covering at least a portion of the medial surface of the upper cushioning layer, located between 30% and 50% of the length of the upper, from the rear end of the interface surface, the covering portion rising up along the medial surface of the upper cushioning layer, at least locally, over a height of at least ten millimeters from the lower bridge.
- The rigid support comprises a medial wing covering a portion of the medial surface of the upper cushioning layer, the cover portion covering at least one strip having a width of at least ten millimeters, this strip extending lengthwise, towards the rear, from the lower bridge to at least one front plane of the outer sole assembly spaced away from the rear end of the interface surface by 20% of the length of the upper.
- The rigid blade and the rigid support are affixed to one another.
- The rigid blade and the rigid support form a unitary part.
- The stiffness of the rigid blade is at least five times greater than the stiffness of the wings of the rigid support.
- The wings of the rigid support are made of a thermoplastic polymer, such as polyamide (PA), thermoplastic polyurethane (TPU), or a composite material composed of a thermoplastic/thermosetting matrix (PA, TPU, epoxy, etc.) combined with fibers (glass, carbon, linen, etc.).

The lower edge of the wings of the rigid support is spaced away from the edge of the lower surface of the outer sole assembly by a distance always greater than five millimeters.

The upper edge of the wings of the rigid support is spaced away from the edge of the upper surface of the outer sole assembly by a distance always greater than eight millimeters.

The rigid support comprises a portion inserted between the upper cushioning layer and a lower rear cushioning layer.

At least one of the wings of the rigid support comprises a flange extending substantially horizontally, towards the center of the sole assembly, from the lower edge of the wing.

The lower surface of the outer sole assembly has a first rear convex portion in the area of the heel defining a rear zone of contact with the ground when the sole is laid flat on the ground. This rear contact zone is in the form of a transverse contact strip having a width less than twenty millimeters, along the longitudinal direction X of the outer sole assembly. The center of the rear contact zone is positioned in a rear support zone located between 10% and 25% of the length of the upper, from the rear end of the upper interface surface.

a second front convex portion in the area of the forefoot defining a front zone of contact with the ground when the sole is laid flat on the ground. This front contact zone is in the form of a transverse contact strip having a width less than twenty millimeters, along the longitudinal direction X of the outer sole assembly. The center of the front contact zone is positioned in a front support zone located between 35% and 50% of the length of the upper, from the front end of the upper interface surface.

The lower cushioning layer comprises a front lower cushioning layer and a rear cushioning layer, connected to one another to form a single, unitary part.

The invention also relates to a sports shoe equipped with an outer sole assembly as defined above.

BRIEF DESCRIPTION OF DRAWINGS

Other characteristics and advantages of the invention will be better understood from the detailed description that follows, with reference to the annexed drawings illustrating, by way of non-limiting embodiments, how the invention can be carried out, and in which.

DETAILED DESCRIPTION

The following of the description makes use of terms such as “vertical”, “upper”, “lower”, “top”, “bottom”, “transverse”, “lateral”, “medial”, “right”, “left”, “horizontal”, “anterior”, “posterior”, “front”, “behind”, “front”, “rear”. These terms should be considered as relative terms in relation to the position of the shoe on the foot of a user in normal posture, and the normal direction of advancement of a user. We will consider a normal posture as a configuration for which the sole is laid flat on a horizontal ground.

The terms “lateral” and “medial” are conventionally understood to mean facing outward and inward, respectively. Thus, the medial side of a foot or a shoe is turned towards the medial side of the other foot or other shoe of the user.

The term “longitudinal” refers to a heel-to-toe direction corresponding to the X axis, while the term “transverse” refers to a medial-to-lateral direction (for a left foot) corresponding to the Y axis and, therefore, substantially perpendicular to the longitudinal direction. The vertical or bottom-to-top direction corresponds to the Z axis. A frontal or coronal YZ plane is a plane perpendicular to an X axis. A sagittal XZ plane is a plane perpendicular to a Y axis. A transverse XY plane is a plane perpendicular to a Z axis.

In the description, a “shoe” is defined by a “sole assembly” and an “upper”. The “sole assembly” is the lower portion of the shoe comprised between the foot and the ground. This is the “bottom” of the shoe. The sole assembly is positioned opposite the sole of the foot. The “upper” is the upper portion of the shoe enveloping the foot and possibly a portion of the ankle, with the exception of the “bottom” of the foot. This is the “top” of the shoe. The upper is affixed to the peripheral edge of the sole assembly. Notably, certain elements of the shoe can form both a portion of the sole assembly and a portion of the upper.

FIGS. 1-10 illustrate the construction of an outer sole assembly according to a first embodiment of the invention in a sports shoe 1. The sports shoe 1 for the left foot shown is a running shoe but could be a completely different type of sports shoe. The shoe 1 is shown in a perspective top view in FIG. 1. It comprises an upper 2 overlaying a sole assembly 3. The upper 2 will not be described in detail below. It can be any upper construction.

Figure 6:
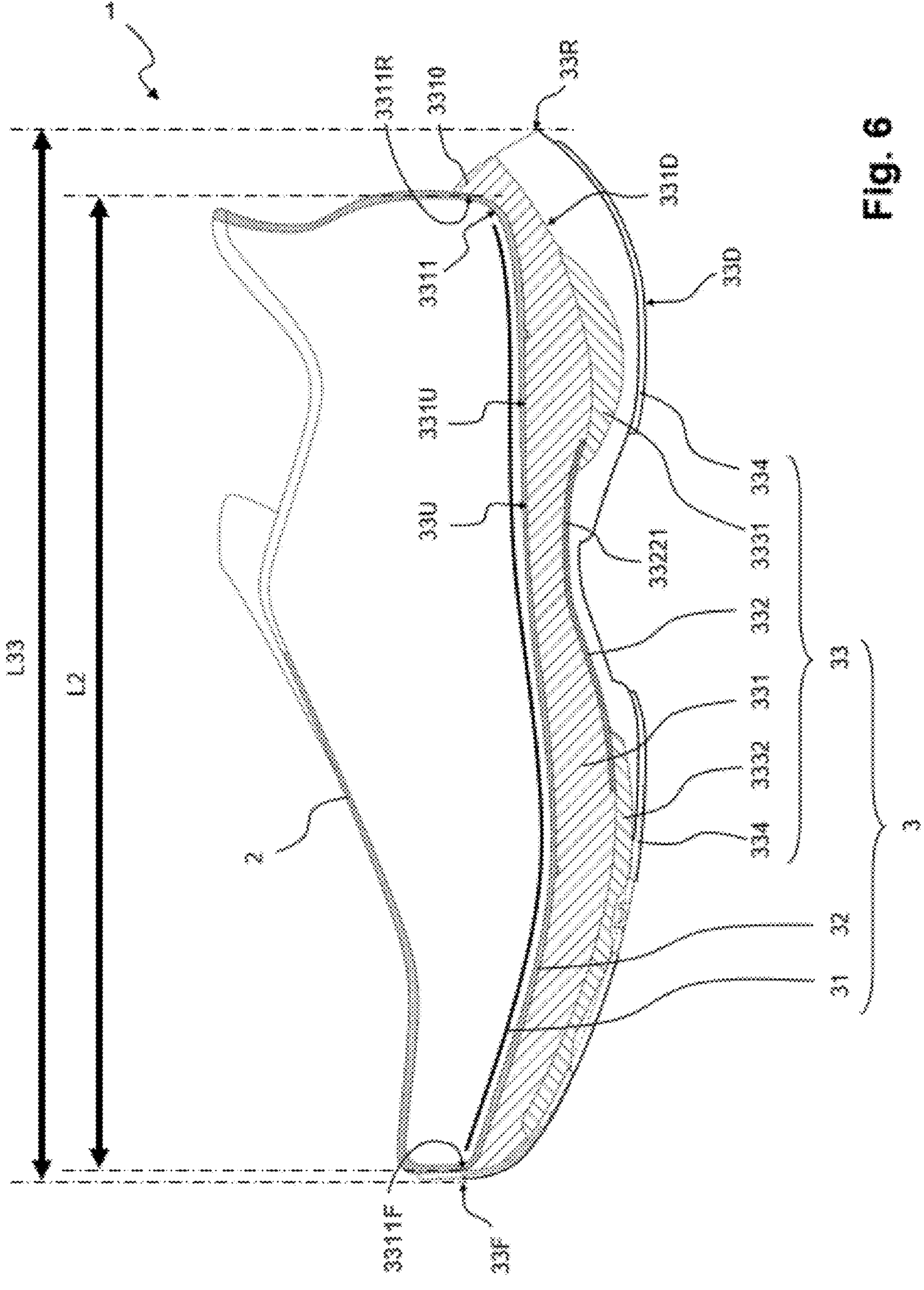
FIG. 6 is a longitudinal cross-sectional view along the line VI-VI of FIG. 5.
Figure 7:
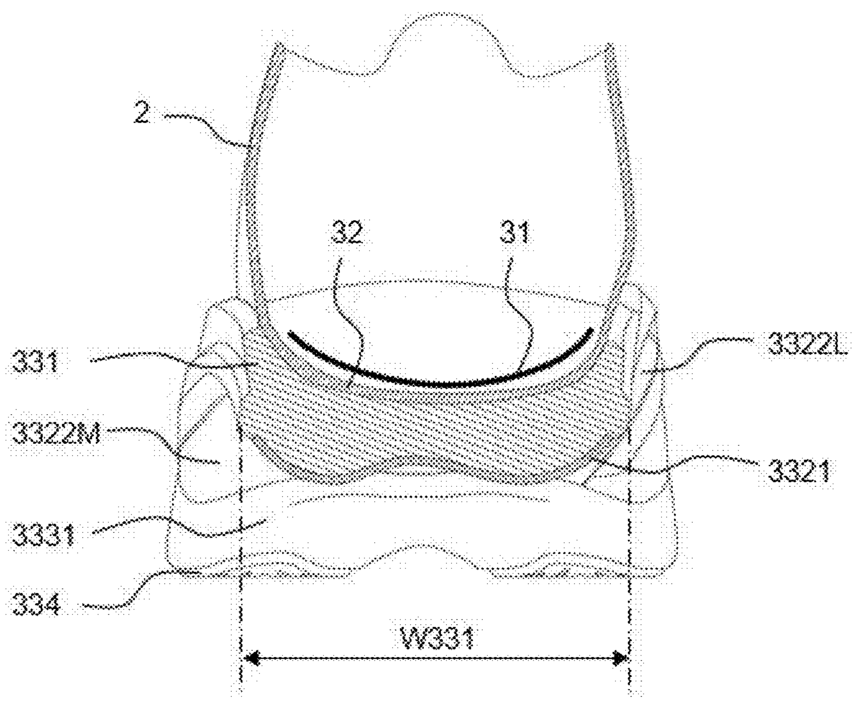
FIG. 7 is a transverse cross-sectional view along the line VII-VII of FIG. 5.
Figure 8:
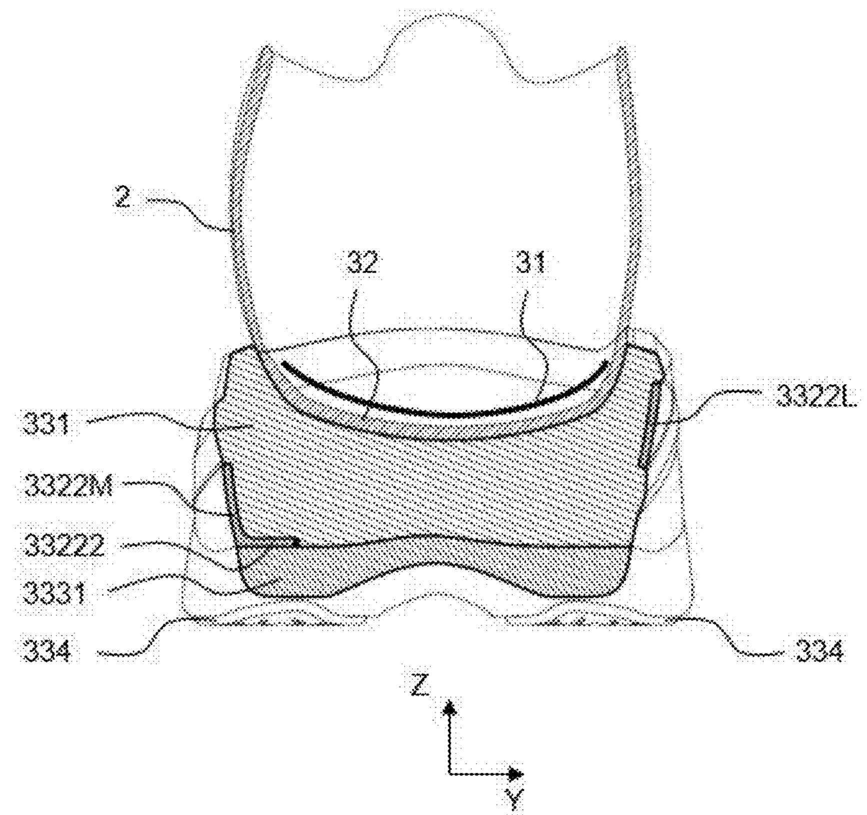
FIG. 8 is a transverse cross-sectional view along the line VIII-VIII of FIG. 5.
Figure 9:
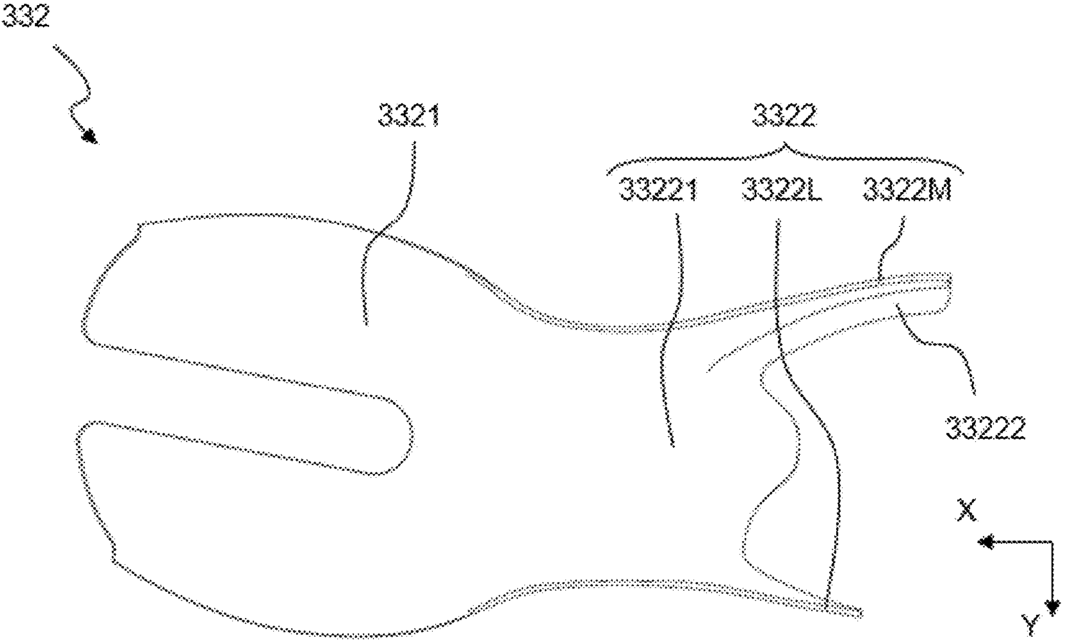
FIG. 9 is a top view of the chassis alone.

The sole assembly 3 comprises superposed layers between the ground and the bottom of foot, as illustrated in FIG. 6. Starting from the foot, the first layer is an sockliner 31. It is generally mounted removably within the shoe. The next layer, located below the sockliner 31, is a insole 32. The second layer 32 is generally fixed to the lower peripheral edges of the upper 2. Finally, an outer sole assembly 33 is located beneath the insole 32. The outer sole assembly 33 is generally fixed to the insole 32 in any conventionally known fashion, for example by an adhesive or glue. The outer sole assembly 33 is intended to come into contact with the ground. The sockliner 31 is optional. The insole 32 is also optional. In the latter case, the upper can be fixed directly to the peripheral edge of the outer sole assembly 33.

The invention relates to a specific construction of the outer sole assembly 33.

The outer sole assembly 33 extends lengthwise from a rear end 33R to a front end 33F, thereby defining a length L33 of the sole assembly, widthwise between a lateral side 33L and a medial side 33M, and heightwise from a lower surface 33D up to an upper surface 33U.

The outer sole assembly 33 comprises an upper cushioning layer 331 extending over substantially the entire length L33 of the outer sole assembly, i.e., at least 90% of the total length of the outer sole assembly. The upper cushioning layer 331 is demarcated heightwise by an upper surface 331U and by a lower surface 331D, and widthwise by a lateral surface 331L and by a medial surface 331M. The periphery of the upper surface 331U comprises a flange 3310 forming a demarcation for the upper 2 of the shoe 1. The inner surface of the flange 3310 and the portion of the upper surface 331U surrounded by this rim form a surface 3311 interfacing with the upper 2. Thus, the interface surface 3311 is demarcated by the inner surface of the flange 3310 and extends lengthwise between a front end 3311F and a rear end 3311R. This length corresponds substantially to the length L2 of the upper. The interface surface 331U is intended to receive the optional insole 32.

The upper cushioning layer 331 is made of a material comprised of cellular foam, for example, based on one of the following materials:

Thermosetting material: ethylene-vinyl acetate (EVA), polyurethane (PU),

Elastomeric thermoplastic material: thermoplastic polyurethane (TPU), thermoplastic polyester-based elastomer (TPEE), polyether amide block (PEBA), thermoplastic polyolefin (TPO/POE)

A mix of the above-mentioned materials.

The upper cushioning layer 331 can be obtained by injection, compression, or by an additive process such as 3D printing. Injection can also be carried out with materials in the supercritical state. The production process may also include an expansion step in an oven under controlled temperature and pressure conditions.

The outer sole assembly 33 also comprises a rigid blade 3321 positioned under the front portion of the lower surface 331D of the upper cushioning layer 331. The rigid blade will stiffen the sole in the area of the metatarsals, thus limiting their flexion and, therefore, the loss of energy generated during flexion of the metatarsophalangeal joint. Furthermore, combined with a sole having a forefoot rocker and more precisely a pivot point upstream of the head of the first metatarsal, the rigid plate makes it possible to exacerbate the rocking effect at the moment force is applied by the runner to the forefoot, thus facilitating propulsion and more generally forward movement. However, it is essential to note that a rigid plate has a positive effect on performance if and only if it is inserted into a sole curved at the front. It is therefore this combination of geometry and stiffness that improves the rolling motion of the foot on the ground as well as propulsion.

Figure 10:
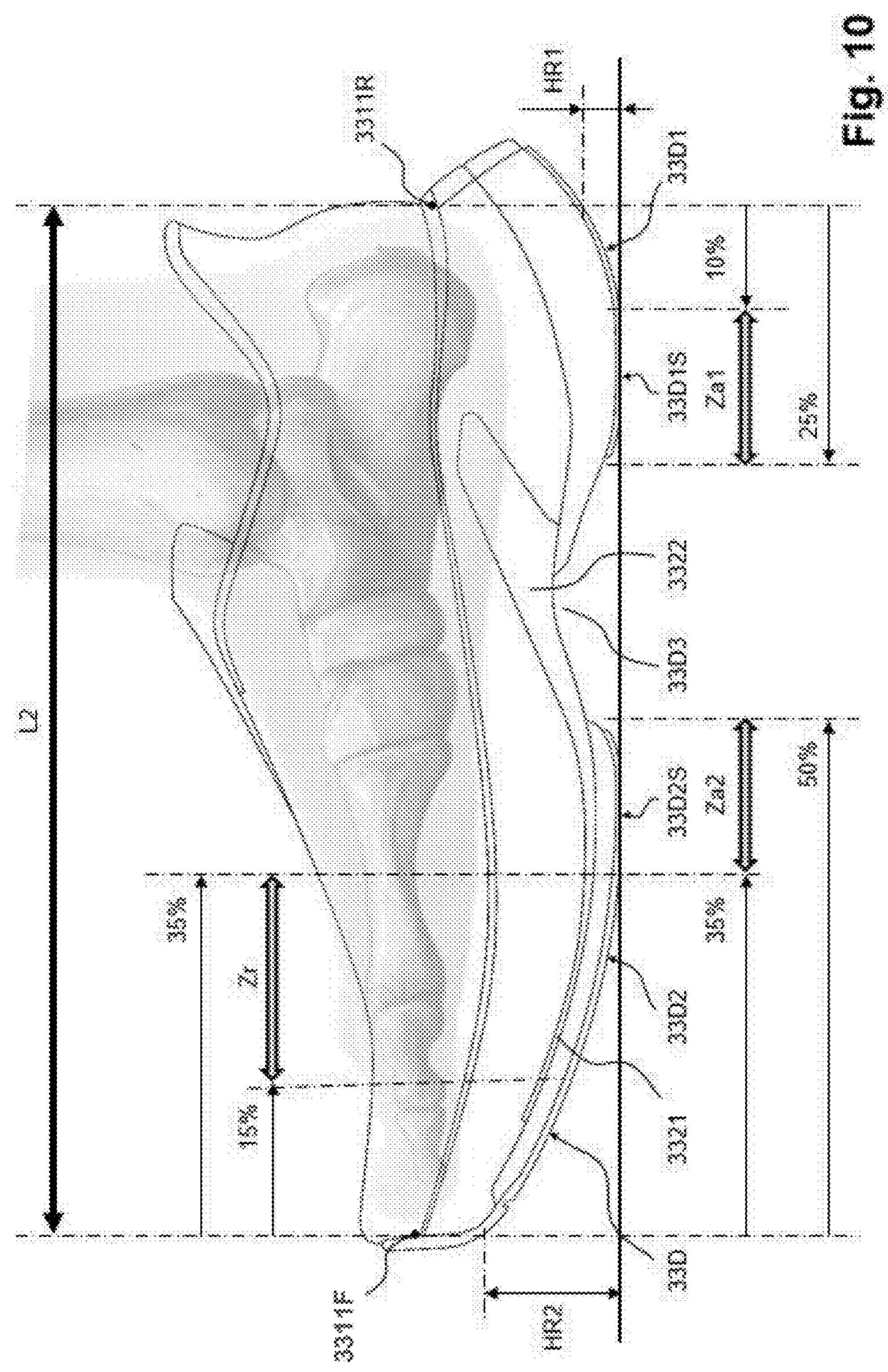
FIG. 10 is the view of FIG. 3 illustrating the position of the supports and of the rigid plate.
Figure 11:
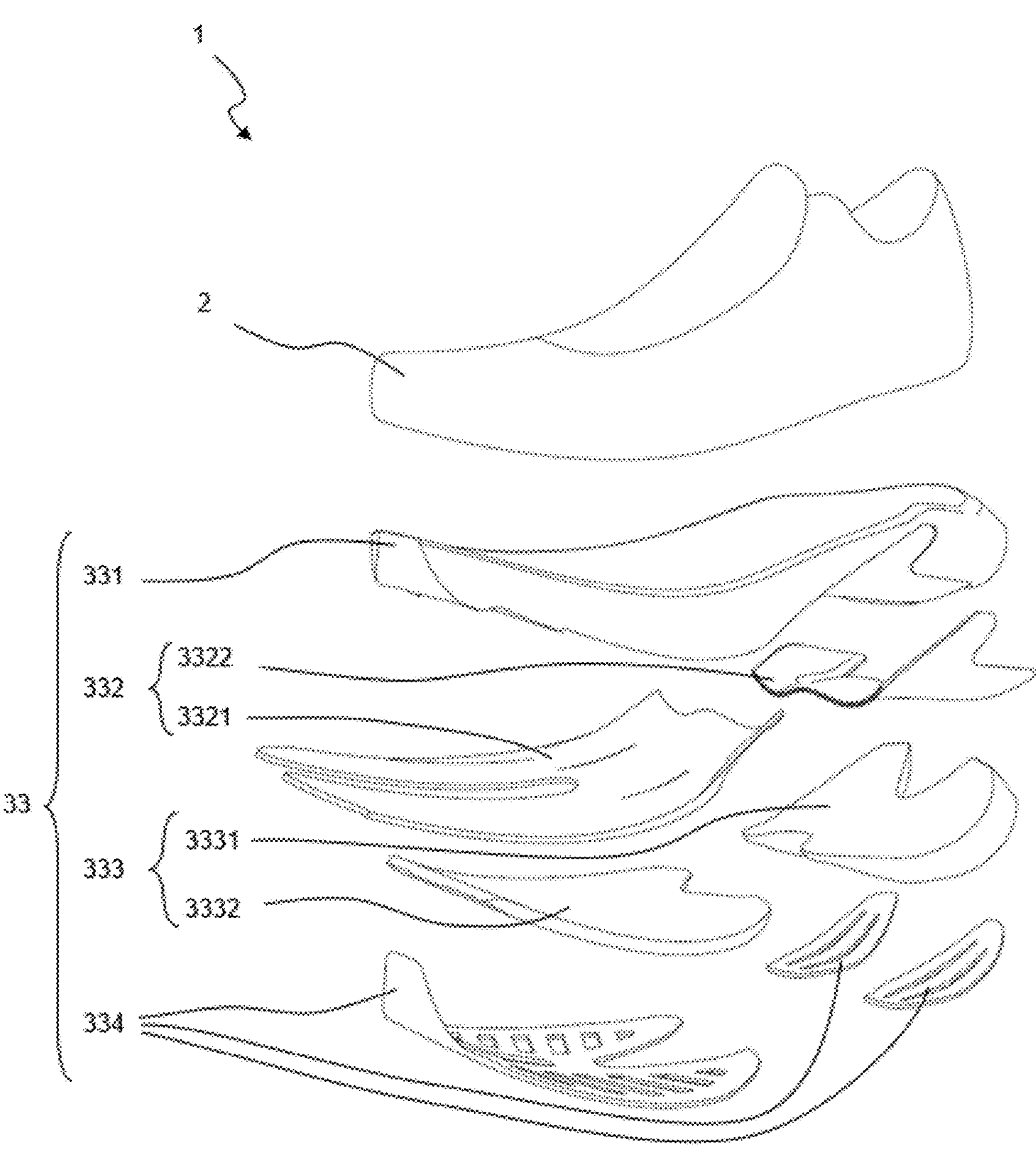
FIG. 11 is an exploded view of a shoe according to a second embodiment.

To obtain this benefit, the rigid blade is arranged at least partially in the front half of the outer sole assembly. According to one embodiment, it covers at least 50% of the surface projected to the ground of the front half of the outer sole assembly 33. Advantageously, the rigid blade 3321 is positioned a minima opposite the pivot point upstream of the head of the first metatarsal. This corresponds to a minima positioning of the rigid blade over an entire rigid zone Zr located between 15% and 35% of the length L2 of the upper, from the front end 3311F of the inner surface 3311. FIG. 10 illustrates this a minima overlap.

The rigid blade 3321 can take various shapes. To cover the desired front portion of the lower surface 331D of the upper cushioning layer 331, the plate can be a solid plate, entirely covering the targeted portion widthwise and lengthwise, or a plate comprising recesses or cutouts, then partially covering the targeted portion. For example, it may include a transverse strip from which a plurality of longitudinal extensions extends. In the example illustrated, the blade comprises a front median slot dividing the front portion of the plate into two longitudinal extensions, one medial and the other lateral. It may also comprise local reinforcements. Along a sagittal plane, it can be flat or concave with one or more radii of curvature whose center is positioned on the side of the upper interface surface 331. This is in fact preferable to facilitate the rocking effect of the foot; this improves the "rocker" effect. Along a frontal plane, it can be flat or concave with one or more radii of curvature whose center is positioned on the side of the upper interface surface 331. Advantageously, the rigid blade comprises at least one zone having a continuity of material along a longitudinal direction to ensure the desired longitudinal stiffness.

The rigid blade 3321 is made of a material having a modulus of elasticity, or Young's modulus, greater than 750 MPa. Advantageously, in order not to penalize comfort and not to overly constrain the foot, the modulus of elasticity is less than 70 GPa. Such a material may be a thermoplastic polymer, for example, polyamide (PA), thermoplastic polyurethane (TPU), or a composite material comprised of a thermoplastic/thermosetting matrix (PA, TPU, epoxy, etc.) combined with fibers (glass, carbon, linen, etc.). According to one embodiment, this material has a hardness greater than 40 shore I), preferably greater than 50 shore D.

The rigid blade can also be made of a plurality of materials affixed to one another. For example, the blade can be obtained by bi-injection, or a combination of layers glued to one another.

The rigid blade 3321 can be obtained by injection, compression, or by an additive process such as 3D printing.

Advantageously, the rigid blade 3321 has an average thickness between 0.7 and 2.0 millimeters.

The outer sole assembly 33 also comprises a lower front cushioning layer 3332 positioned under the rigid blade 3321. Thus, the rigid blade 3321 is inserted between the upper cushioning layer 331 and a lower front cushioning layer 3332.

The front lower cushioning layer 3332 is made of a material comprised of cellular foam, for example, from one of the following materials:

Thermosetting material: ethylene-vinyl acetate (EVA), Polyurethane (PU),

Elastomeric thermoplastic material: thermoplastic polyurethane (TPU), thermoplastic polyester-based elastomer (TPEE), polyether amide block (PEBA), thermoplastic polyolefin (TPO/POE)

A mix of previous materials.

The lower front cushioning layer 3332 can be obtained by injection, compression, or by an additive process such as 3D printing. Injection can also be carried out with materials in the supercritical state. The production process may also include an expansion step in an oven under controlled temperature and pressure conditions.

As we have seen above, to obtain good rolling motion, the lower surface of the lower front cushioning layer 3332 is advantageously concave and dimensioned to obtain a forefoot rocker, and more precisely a pivot point behind the head of the first metatarsal (towards the heel).

According to the invention, the outer sole assembly 33 also comprises a rigid support 3322.

This rigid support 3322 comprises a lower bridge 33221 covering a portion of the lower surface 331D of the upper cushioning layer 331. The lower bridge 33221 extends substantially (at least over 90%) over the entire width W331 of this upper cushioning layer 331 in the area of at least one transverse segment of a central zone Ze located between 30% and 50% of the length L2 of the upper, from the rear end 3311R of the interface surface 3311. Thus, the lower bridge 33221 can cover the width W331 of this upper cushioning layer 331 over the entire central zone Zc or, alternatively, locally over a portion of the length of the sole. In the latter case, the transverse cover segment extends over a length, along the longitudinal direction X of the sole assembly, by at least twenty millimeters in order to ensure a certain strength, rigidity, of the rigid support and good support of the lateral and medial wings. This transverse segment could include recesses.

This rigid support 3322 also comprises a lateral wing 3322L covering a portion of the lateral surface 331L of the upper cushioning layer 331, the cover portion covering at least one strip having a width HL of at least ten millimeters, this strip extending lengthwise towards the rear, from the lower bridge 33221 of the rigid support 3322 to at least one frontal plane PL of the outer sole assembly spaced away from the rear end 3311R of the interface surface 3311 by 20% of the length L2 of the upper. This rigid support 3322 also comprises a medial wing 3322M covering a portion of the medial surface 331M of the upper cushioning layer 331, the cover portion covering at least one strip having a width HL of at least ten millimeters, this strip extending lengthwise towards the rear, from the lower bridge 33221 of the rigid support 3322 to at least one frontal plane PM of the outer sole assembly spaced away from the rear end 3311R of the interface surface 3311 by 20% of the length L2 of the upper.

Figure 1:
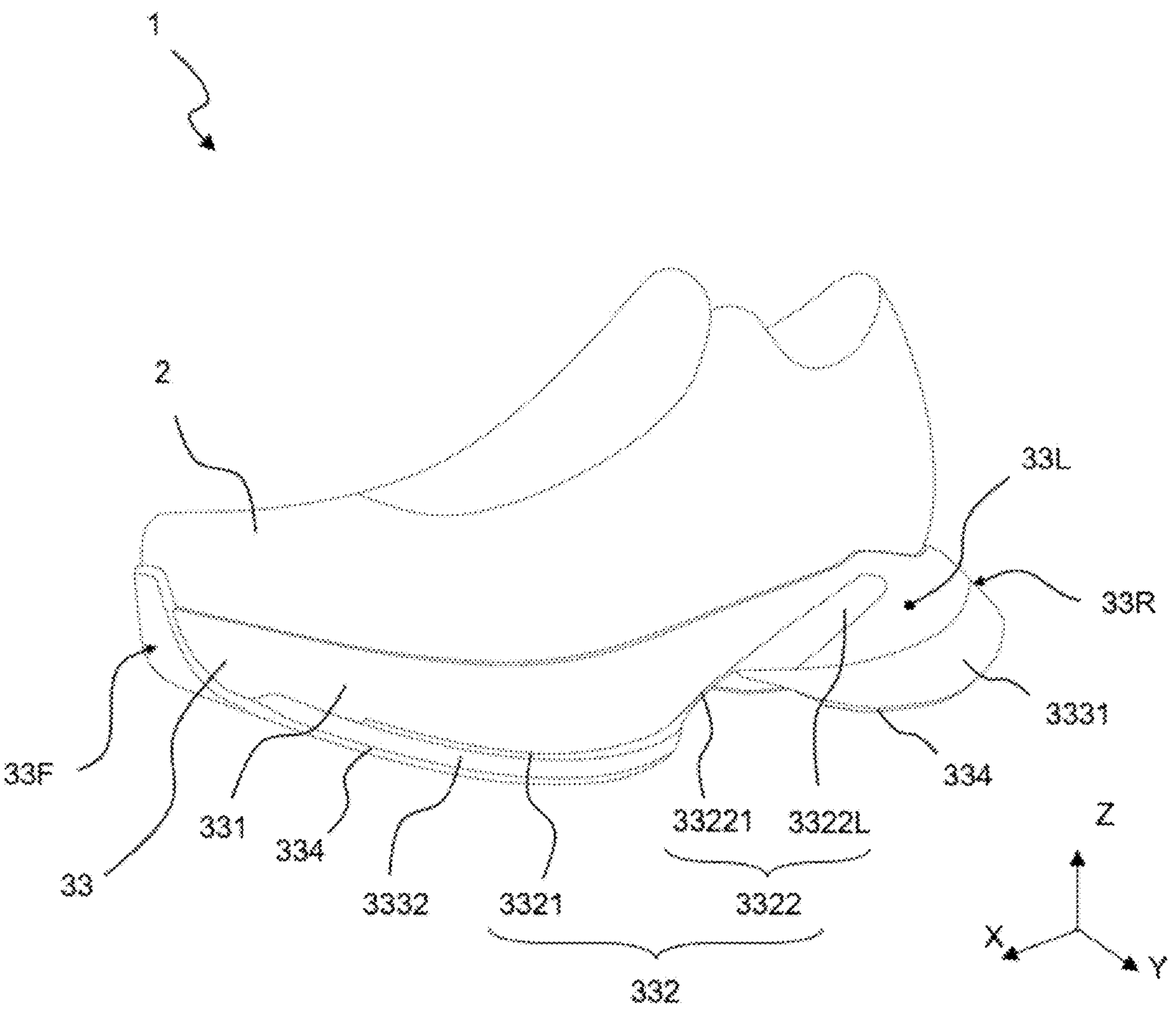
FIG. 1 is a front perspective top view of a shoe for the left foot according to a first embodiment of the invention.
Figure 2:
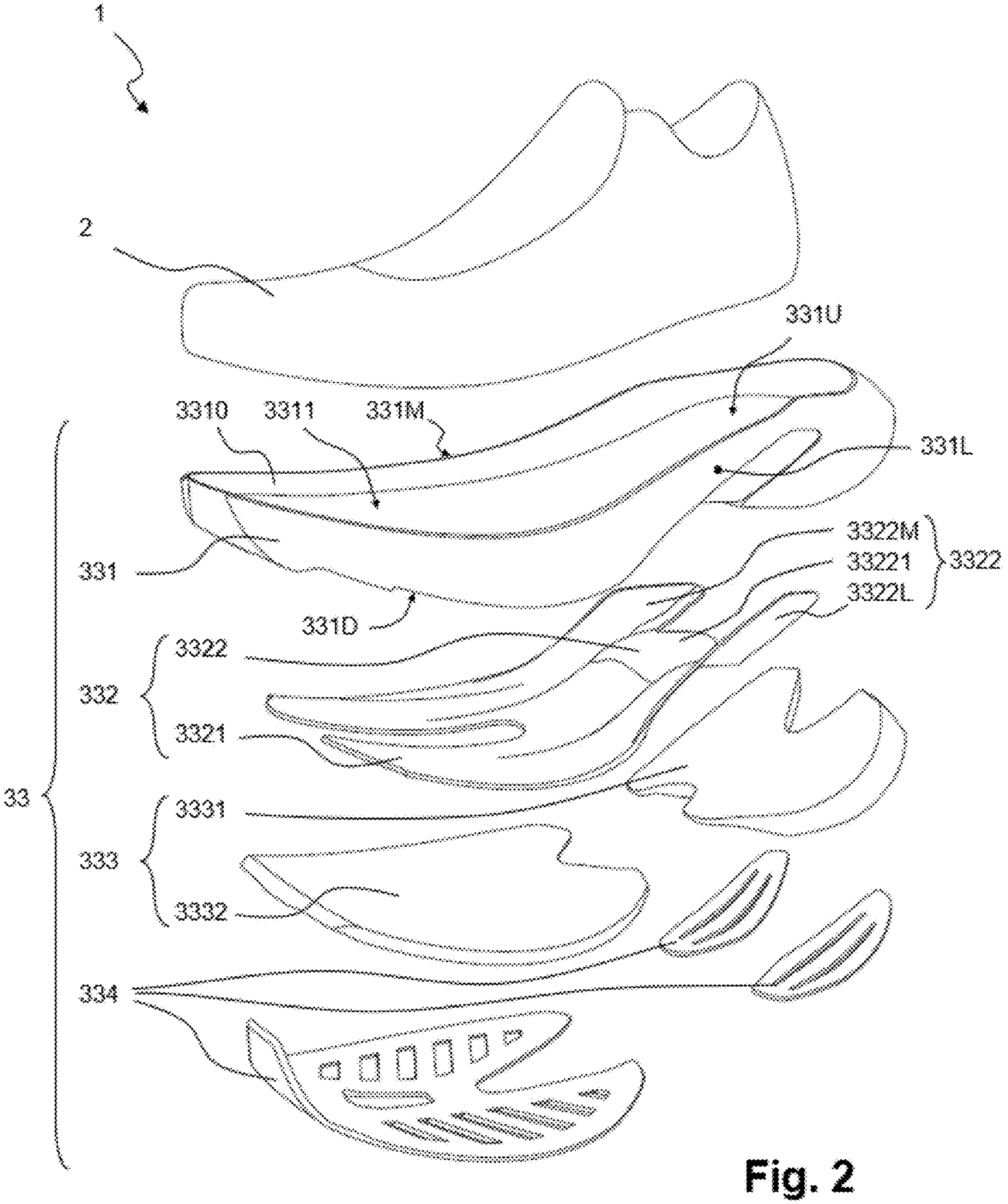
FIG. 2 is an exploded view of the shoe of FIG. 1.
Figure 3:
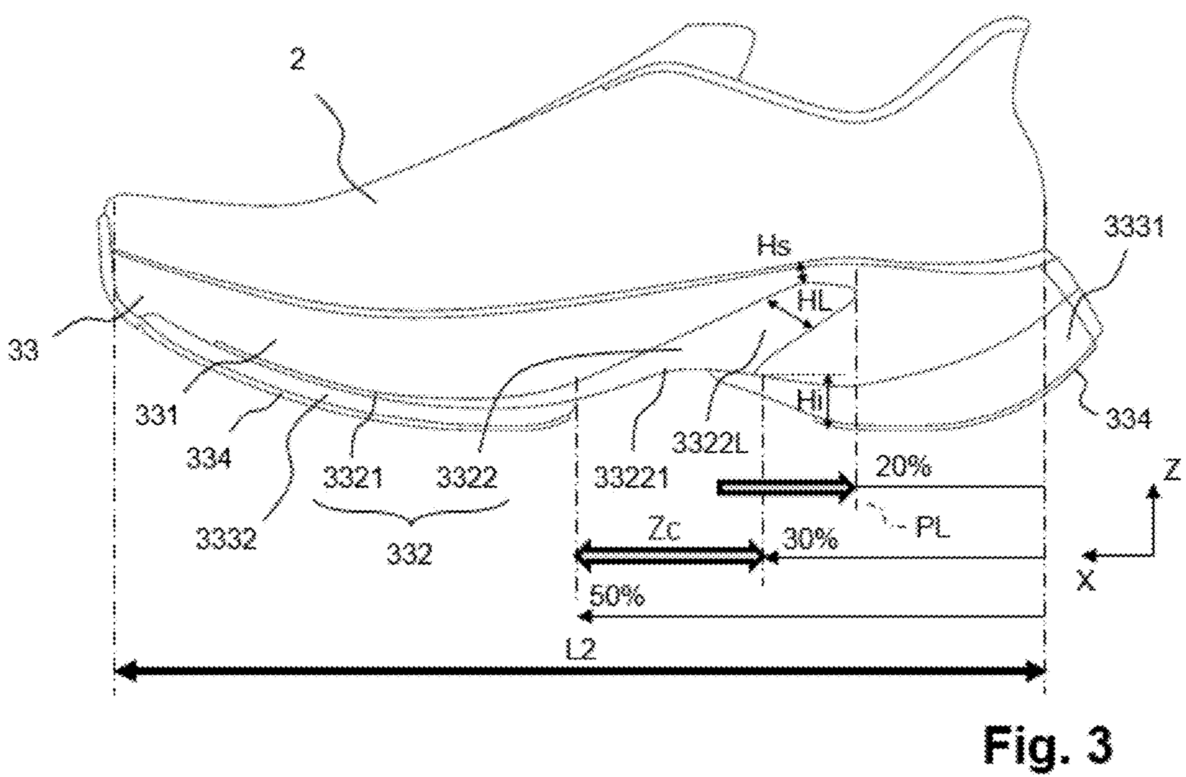
FIG. 3 is a side view, lateral side, of the shoe of FIG. 1.
Figure 4:
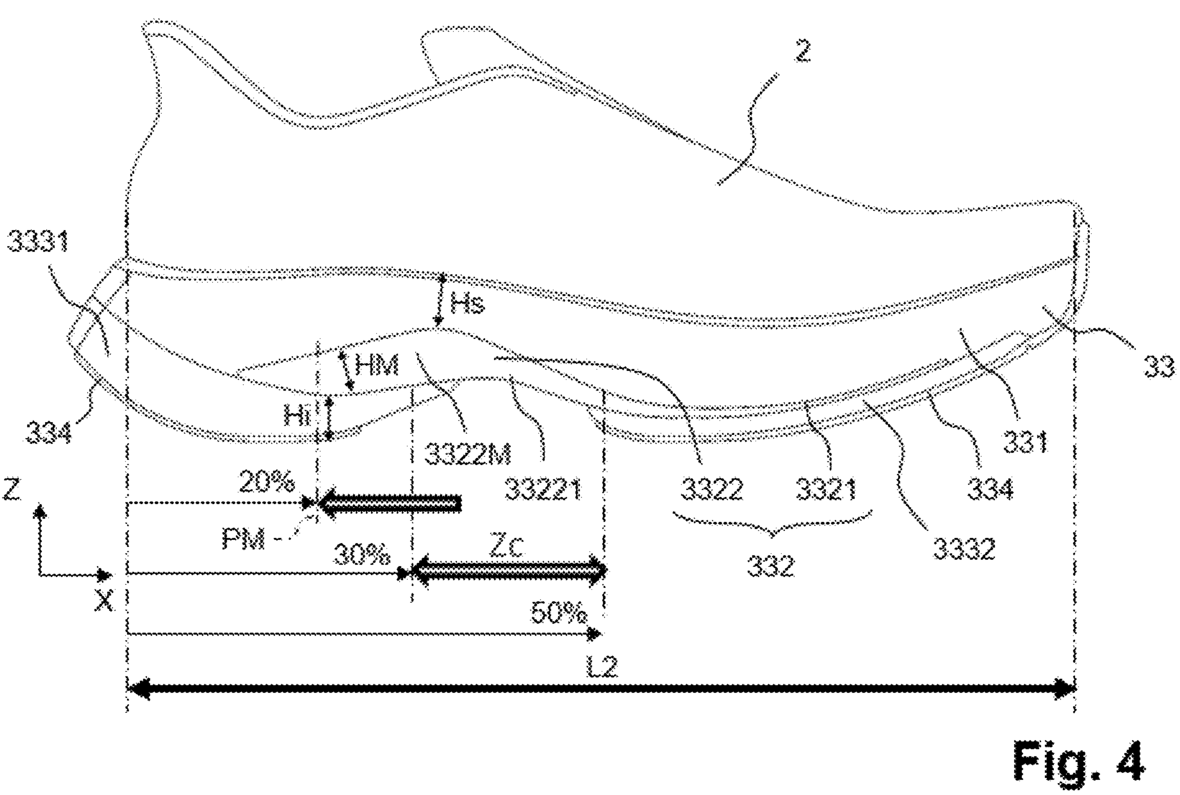
FIG. 4 is a side view, medial side, of the shoe of FIG. 1.
Figure 5:
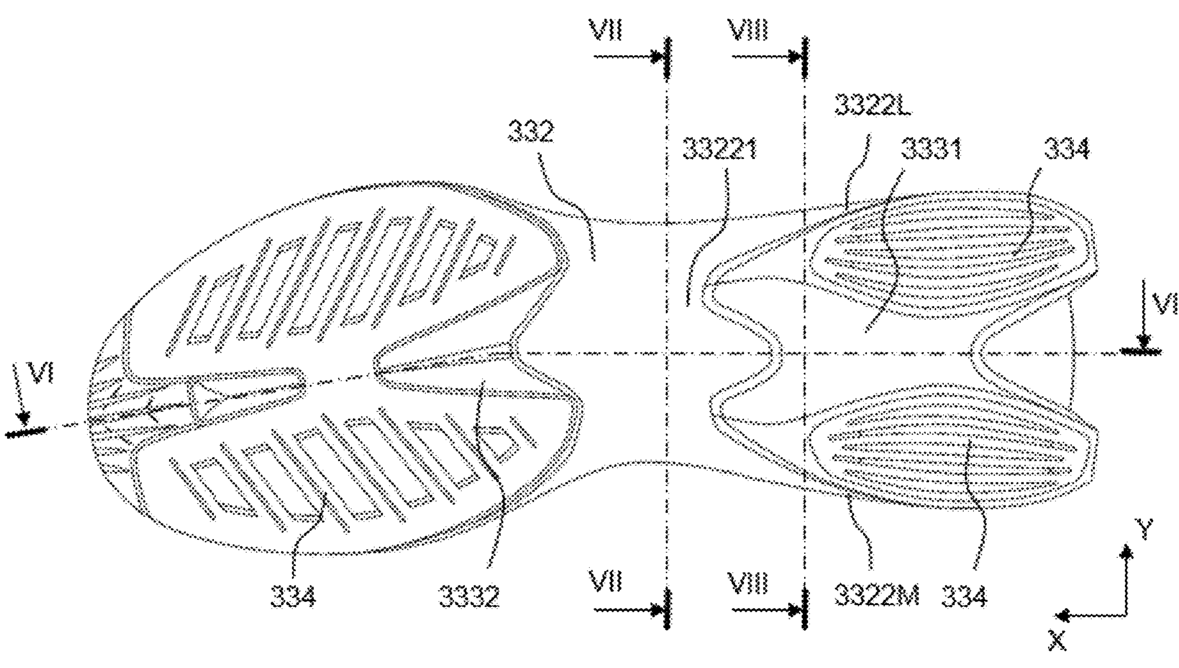
FIG. 5 is a bottom view of the shoe of FIG. 1.

In the context of the invention, the strip extends lengthwise towards the rear, up to at least one frontal plane, meaning that the strip comprises at least one end or one edge in the area of this plane. The width HL, HM of the strip, measured vertically (along a direction Z) does not need to be at least ten millimeters in the area of this frontal plane. FIG. 3 illustrates this interpretation.

The lower bridge 33221, the lateral wing 3322L and the medial wing 3322M may comprise recesses or cutouts. The minima cover portion of the lateral wing 3322L and/or the medial wing 3322M can form an inclined strip; it is therefore not necessarily rectilinear or horizontal. Furthermore, the wings 3322L, 3322M do not necessarily have the same dimensioning and/or arrangement (dissymmetry).

According to one embodiment, the lateral wing 3322L and/or the medial wing 3322M extends lengthwise further towards the rear, from the lower bridge 33221 of the rigid support 3322 to at least one frontal plane of the outer sole assembly spaced away by 10% of the length L2 of the upper, from the rear end 3311R of the interface surface 3311. This makes it possible to better contain the lateral deformation of the upper cushioning layer 331 and, therefore, to improve the resilience of the outer sole, particularly at the start of the heel strike phase.

According to one embodiment, the lateral wing 3322L and the medial wing 3322M do not cover the entire height of all the cushioning layers of the outer sole assembly in the area of the heel.

For example, the wings are dimensioned so that the upper edge of these wings is always away by a distance Hs of at least five millimeters from the upper peripheral edge of the outer sole assembly, in other words, from the edge of the upper surface 33U of the outer sole assembly 33.

According to another example, the wings are dimensioned so that the lower edge of these wings is always distant by a distance Ii of at least six millimeters from the lower peripheral edge of the outer sole assembly, in other words, from the edge of the lower surface 33D of the outer sole assembly 33.

According to one embodiment, these wings are dimensioned such that the upper edge of these wings is always away by a distance Hs of at least five millimeters from the upper peripheral edge of the outer sole assembly, and that the lower edge of these wings is always away by a distance Hi of at least six millimeters from the lower peripheral edge of the outer sole assembly.

These different variants make it possible to preserve good vibration shock absorption properties because the cushioning layers of the outer sole assembly can be crushed freely in these zones not covered by the wings.

According to one embodiment, at least one of the lateral or medial wings comprises a lower flange 33222 extending substantially horizontally, towards the center of the sole assembly, from the lower edge of the wing. The flange 33222 can extend over the entire length of the wing or partially. The lower flange 33222 covers a portion of the lower surface 331D of the upper cushioning layer 331. Advantageously, this covering extends inwards over a distance of at least five millimeters from the lower peripheral edge of the lower surface 331D. The lower flange 33222 is intended to be affixed to the upper cushioning layer, for example, by an adhesive or glue. This flange improves the ability to maintain the wing in position by reducing its transverse spacing, particularly during strides during which the sole assembly is crushed, causing transverse bias of the wing due to the deformation of the upper cushioning layer. The risk of fatigue deterioration of the wings resulting from repetitive bias is also reduced.

Tests have shown that to obtain good behavior of the shoe and mainly good support, it is especially important to have a rigid support 3322 with a lateral wing 3322L in order to limit the crushing of the cushioning layer during the "strike" phase of the foot during which the cushioning layer tends to deform outwards. The lateral wing then tends to contain this deformation for better stability and to promote energy restitution.

Thus, an alternative solution to those described above is to have a rigid support 3322 without a medial wing 3322M but only provided with a lateral wing 3322L. The absence of a medial wing allows less bias of the cushioning layer during heel impacts and, therefore, reduces the risk of locally damaging the cushioning layer.

Figure 12:
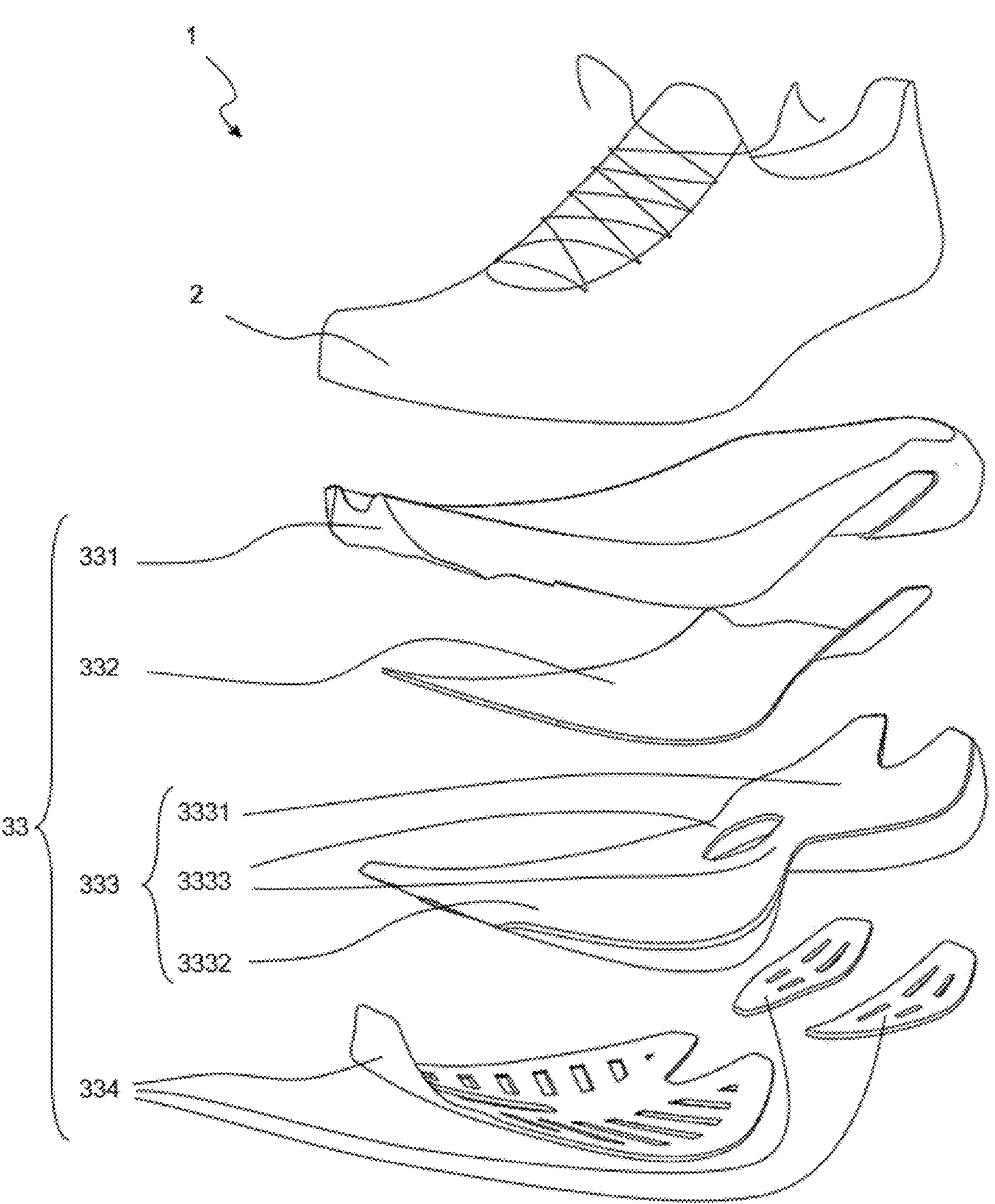
FIG. 12 is an exploded view of a shoe according to a third embodiment.
Figure 13:
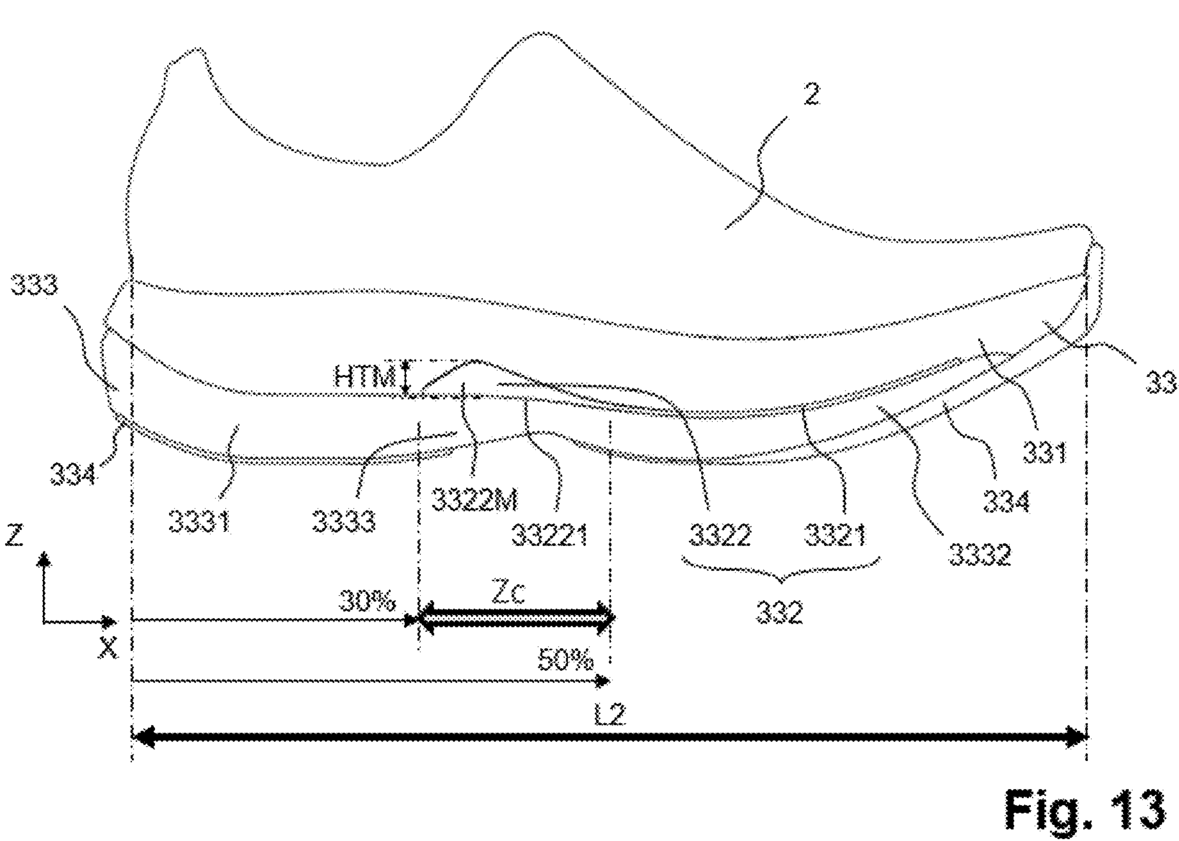
FIG. 13 is a side view, medial side, of the shoe of FIG. 12.
Figure 14:
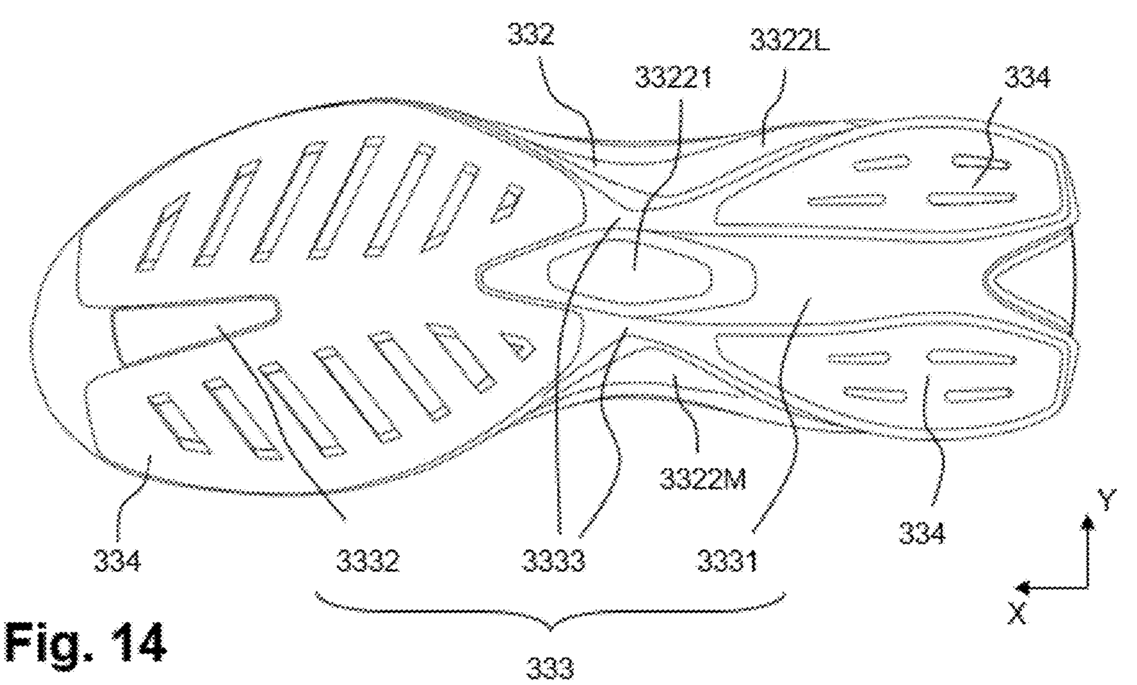
FIG. 14 is a bottom view of the shoe of FIG. 12.

According to another embodiment illustrated in FIGS. 12-14, the construction is a compromise between the previous alternative solution and the other embodiments. In this example, the rigid support 3322 comprises a lateral wing 3322L and a medial wing 3322M. The lateral wing 3322L is similar to that described in the previous embodiments, and in particular that illustrated in FIG. 3. However, the medial wing 3322M here is more compact. It is located in the area of the medial portion of the arch of the foot and does not extend rearward. This design provides arch support which improves comfort and stability during rolling motion of the foot. Thus, the rigid support 3322 comprises a medial wing 3322M covering at least a portion of the medial surface 331M of the upper cushioning layer 331, located between 30% and 50% of the length L2 of the upper, from the rear end 3311R of the interface surface 3311, the cover portion rising up along the medial surface 331M of the upper cushioning layer 331, at least locally, over a height HTM of at least ten millimeters from the lower bridge 33221.

The rigid support 3322 is made of a material having a modulus of elasticity, or Young's modulus, greater than 100 MPa. Advantageously, in order not to penalize the vibration shock absorption property of the cushioning layer of the upper cushioning layer, the modulus of elasticity is less than 2,000 MPa. Such a material may be a thermoplastic polymer, for example polyamide (PA), thermoplastic polyurethane (TPU), or a composite material comprised of a thermoplastic/thermosetting matrix (PA, TPU, epoxy, etc.) combined with fibers (glass, carbon, linen, etc.). According to one embodiment, this material has a hardness greater than 40 shore D, preferably greater than 50 shore D.

The rigid support 3322 can be obtained by injection, compression, or by an additive process such as 3D printing.

The rigid support can also be made of a plurality of materials affixed to one another. For example, the rigid support can be obtained by bi-injection.

Advantageously, the rigid support 3322 has a thickness between 0.7 and 2.0 millimeters.

Advantageously, the rigidity of the rigid blade 3321 is greater than the rigidity of the wings 3322L, 3322M of the rigid support 3322. In other words, for the same force exerted perpendicular to these parts, the wings flex more than the blade. This rigidity can be obtained by the dimensioning (thickness, width, length, etc.) and/or the choice of material. Thus, the modulus of elasticity of the constituent material of the rigid blade can advantageously be greater than the modulus of elasticity of the constituent material of the wings of the rigid support, at least five times greater. Indeed, it is not necessary to have wings which strongly limit the lateral expansion of the cushioning layer. Conversely, the rigid blade must stiffen the sole in the area of the metatarsals, in order to limit their flexion. The rigidity of the rigid blade must therefore be sufficient to reduce its deformation. In addition, this allows the use of a lighter material for the rigid support, thereby reducing the weight of the shoe and, therefore, providing comfort.

According to one embodiment, the rigid blade and the rigid support are two separate parts, spaced apart from one another. Alternatively, these two separate parts can be affixed to one another by any appropriate means, for example, by gluing or welding. This variant ensures continuity in the rolling motion, facilitates assembly, and improves the resilience of the sole assembly. According to another embodiment, the rigid blade and the rigid support form a single unitary part, a rigid chassis 332. This variant facilitates assembly and reduces the number of constituent parts. Similarly, this ensures continuity in the rolling motion and improves the resilience of the sole assembly. According to one variant, this rigid chassis can be obtained by bi-injection in order to use different materials for the rigid blade portion and the rigid support portion. This makes it possible to obtain the desired difference in rigidity as seen above. According to a variant, the lower surface of the rigid chassis 332 comprises a hollow in the area of the arch of the foot. Thus, the chassis 332 forms a bump oriented towards the foot. This hollow makes it possible to increase the flexional and torsional stiffness with a reduced thickness, and thus to avoid deformation of the sole during the transition phase which could potentially waste energy. This also reduces the weight of the chassis 332.

According to one embodiment, the outer sole assembly 33, in the area of the heel, comprises a lower rear cushioning layer 3331 positioned under the upper cushioning layer 331. According to certain embodiments, a portion 33222, 33223 of the rigid support 3322 can be inserted between the upper cushioning layer 331 and the lower rear cushioning layer 3331. For example, this inserted portion can be a portion of the flange 33222 of one wing or both wings. According to another example, this inserted portion can be an extension 33223 of the rigid support 3322; the extension extending rearwardly from the lower bridge 33221 in the area of the median of the sole assembly. Due to this extension sandwiched between two cushioning layers, the rigid support 3322 is better held in position in the sole assembly.

The rear lower cushioning layer 3331 is made of a material comprised of cellular foam, for example from one of the following materials:

- Thermosetting material: ethylene-vinyl acetate (EVA), polyurethane (PU),
- Elastomeric thermoplastic material: thermoplastic polyurethane (TPU), thermoplastic polyester-based elastomer (TPEE), polyether amide block (PEBA), thermoplastic polyolefin (TPO/POE)
- A mix of the above materials.

The lower rear cushioning layer 3331 can be obtained by injection, compression, or by an additive process such as 3D printing. Injection can also be carried out with materials in the supercritical state. The production process may also include an expansion step in an oven under controlled temperature and pressure conditions.

The lower cushioning layer 333 of the outer sole assembly 33 is thus comprised of the lower front cushioning layer 3332 and the rear cushioning layer 3331.

According to one embodiment, illustrated in FIGS. 12-14, the lower front cushioning layer 3332 and the rear cushioning layer 3331 are connected to form a single, unitary part constituting the lower cushioning layer 333. This facilitates the assembly process and reduces the number of constituent parts. According to one embodiment, this common lower cushioning layer may locally comprise recesses, windows or cutouts. Thus, the outer sole assembly 33 may not include a lower cushioning layer locally (in its thickness), for example in a central zone in the area of the arch of the foot. Connecting the lower front cushioning layer 3332 and the rear cushioning layer 3331 via bridges 3333 makes it possible to protect the rigid support 3322, particularly from shocks and the risk of cracking and/or breakage when the sole is abnormally deformed by flexion. The bridges make it possible to limit these abnormal flexions.

According to one embodiment, the upper cushioning layer 331 extends to the ground in its rear portion, in the area of the heel. In this case, there is no rear cushioning layer 3331.

According to one embodiment, the lower surface 33D of the outer sole assembly 33 is raised at the front and/or at the rear in order to facilitate the rolling motion of the foot. Reference is then made to a "rocker" sole.

According to one embodiment, the lower surface 33D of the outer sole assembly 33 is raised at the front and at the rear and forms an arch 33D3 in the area of the arch of the foot. Reference is then made to a "double rocker" sole. This construction facilitates the rolling motion but also the switch from the heel strike phase to the propulsive phase, making the stride more dynamic. One such example is illustrated in FIG. 10.

In this example, the lower surface 33D of the outer sole assembly 33 has a first rear convex portion 33D1 in the area of the heel defining a rear zone 33D1S of contact with the ground when the sole is laid flat on the ground. This rear contact zone 33D1S is in the form of a transverse contact strip having a width less than twenty millimeters, along the longitudinal direction X of the outer sole assembly. The center of the rear contact zone 33D1S is positioned in a rear support zone Za1 located between 10% and 25% of the length L2 of the upper, from the rear end 3311R of the upper interface surface 3311. The positioning and dimensioning of the contact strip in this rear contact zone 33D1S makes it possible to shorten the impact phase and reduce the antero-posterior forces. Furthermore, the lower surface 33D of the outer sole assembly 33 has a second front convex portion 33D2 in the area of the forefoot defining a front zone 33D2S of contact with the ground when the sole is laid flat on the ground. This front contact zone 33D2S is in the form of a transverse contact strip having a width less than twenty millimeters, along the longitudinal direction X of the outer sole assembly. The center of the front contact zone 33D2S is positioned in a front support zone Za2 located between 35% and 50% of the length L2 of the upper, from the front end 3311F of the upper interface surface 3311. The positioning and dimensioning of the contact strip in this front contact area 33D2 make it possible to accelerate the transition toward the front of the shoe.

Apart from these two contact zones 33D1 and 33D2, the lower surface 33D of the outer sole assembly 33 is away from the ground. In the portion anterior to the front contact zone 33D2S, the outer sole assembly is convex so as to obtain a good drop at the front of the outer sole assembly. Thus, at right angle with the front end 3311F of the interface surface 3311, the lower surface 33D of the outer sole assembly 33 is spaced from the ground by a distance HR2 greater than thirty millimeters. In the portion posterior to the rear contact zone 33D1S, the outer sole assembly is convex so as to obtain a good drop at the rear of the outer sole assembly. Thus, at right angle with the rear end 3311R of the interface surface 3311, the lower surface 33D of the outer sole assembly 33 is spaced from the ground by a distance HR1 greater than ten millimeters. In the central portion of the sole assembly, between the two contact zones 33D1S and 33D2S, the outer sole assembly is concave, thus forming an arch.

The specific location of the two contact zones 33D1S and 33D2S makes it possible to substantially accelerate the rolling motion of the foot on the ground during the stages of the shoe support phase, initial contact, half-support and propulsion. This construction will accelerate/facilitate the forward rocking of the shoe and, therefore, propulsion. Thus, the user will have less power to provide. The geometry of the sole assembly outside of these contact zones, as defined above, accentuates this benefit.

The outer sole assembly 33 may comprise a wear layer 334 intended to come into contact with the ground. The wear layer thus defines a portion of the lower surface 33D of the outer sole assembly 33. The wear layer 334 is not necessarily continuous to completely cover the lower surface with a cushioning layer.

The assembly between the components 331, 332 (3321, 3322), 3331, 3332, 334 of the outer sole assembly can be carried out by any appropriate means, for example by bonding, welding.

The invention is not limited to the embodiments previously described. It is also possible to combine these embodiments. The invention extends to all the embodiments covered by the appended claims.

REFERENCES

1. Shoe
2. Upper
3. Sole Assembly

-continued

REFERENCES

31. Sockliner
32. Insole
33. Outer sole assembly
    331. Upper cushioning layer
        3310. Flange
        3311. Interface surface
            3311F. Front end
            3311R. Rear end
            L2. Length of upper
        331U. Upper surface
        331D. Lower surface
        331L. Lateral surface
        331M. Medial surface
    332. Rigid chassis
        3321. Rigid blade
        3322. Rigid support
            3322L. Lateral wing
            3322M. Medial wing
            33221. Lower bridge
            33222. Flange
            33223. Extension
333. Lower cushioning layer
    3331. Rear lower cushioning layer
    3332. Front lower cushioning layer
    3333. Bridges
334. Wear layer

The invention claimed is:

1. Outer sole assembly of a shoe comprising:

an upper cushioning layer comprising an interface surface along a periphery of the upper cushioning layer, the interface surface configured to interface with an upper of the shoe, the upper cushioning layer extending over a length of the outer sole assembly, a lower cushioning layer made of cellular foam, a one-piece rigid blade, having a modulus of elasticity greater than 750 MPa, inserted between the upper cushioning layer and the lower cushioning layer, the rigid blade covering at least 50% of the surface projected to the ground of the front half of the outer sole assembly, and a rigid support having a modulus of elasticity greater than 100 MPa, comprising:

a lower bridge covering a portion of the lower surface of the upper cushioning layer, the lower bridge extending substantially over the entire width of the upper cushioning layer in the area of at least one transverse segment of a central zone located between 30% and 50% of the length of the upper, from the rear end of the interface surface; and a lateral wing covering a portion of the lateral surface of the upper cushioning layer, the covering portion covering at least a strip having a width (HL) of at least ten millimeters, the strip extending lengthwise towards the rear, from the lower bridge to at least one frontal plane (PL) of the outer sole assembly spaced away from the rear end of the interface surface by 20% of the length (L2) of the upper.

2. Outer sole assembly according to claim 1, wherein:

the rigid support also comprises a medial wing covering at least a portion of the medial surface of the upper cushioning layer, located between 30% and 50% of the length (L2) of the upper, from the rear end of the interface surface, the cover portion rising up along the medial surface of the upper cushioning layer, at least locally, over a height (HTM) of at least ten millimeters from the lower bridge.

3. Outer sole assembly according to claim 2, wherein: the rigidity of the rigid blade is at least five times greater than the rigidity of one and/or both wings of the rigid support.

4. Outer sole assembly according to claim 2, wherein: one and/or both wings of the rigid support are made of a thermoplastic polymer, such as polyamide (PA), thermoplastic polyurethane (TPU), or a composite material comprised of a thermoplastic/thermosetting matrix (PA, TPU, epoxy, etc.) combined with fibers (glass, carbon, linen, etc.).

5. Outer sole assembly according to claim 2, wherein: the lower edge of one and/or both wings of the rigid support is spaced away from the edge of the lower face of the outer sole assembly, by a distance (Hi) always greater than five millimeters.

6. Outer sole assembly according to claim 2, wherein: the upper edge of one and/or both wings of the rigid support is spaced away from the edge of the upper surface of the outer sole assembly, by a distance (Hs) always greater than eight millimeters.

7. Outer sole assembly according to claim 2, wherein: at least one wing of the rigid support comprises a flange extending substantially horizontally towards the center of the sole assembly, from the lower edge of the wing.

8. Outer sole assembly according to claim 2, wherein: the lateral wing and the medial wing do not cover the entire height of all the cushioning layers of the outer sole assembly in the area of the heel.

9. Outer sole assembly according to claim 1, wherein: the rigid support also comprises a medial wing covering a portion of the medial surface of the upper cushioning layer, the cover portion covering at least one strip having a width (HM) of at least ten millimeters, the strip extending lengthwise towards the rear, from the lower bridge to the at least one frontal plane (PM) of the outer sole assembly spaced away from the rear end of the interface surface by 20% of the length (L2) of the upper.

10. Outer sole assembly according to claim 1, wherein: the rigid blade and the rigid support are affixed to one another.

11. Outer sole assembly according to claim 1, wherein: the rigid blade and the rigid support form a unitary part.

12. Outer sole assembly according to claim 1, wherein: the rigid support comprises a portion inserted between the upper cushioning layer and a rear portion of the lower cushioning layer.

13. Outer sole assembly according to claim 1, wherein: the lower surface of the outer sole assembly comprises:

a first rear convex portion in the area of the heel defining a rear zone of contact with the ground when the sole is laid flat on the ground, the rear contact zone being in the form of a transverse contact strip having a width less than twenty millimeters, along the longitudinal direction X of the outer sole assembly, the center of the rear contact zone being positioned in a rear support zone located between 10% and 25% of the length of the upper, from the rear end of the upper interface surface; and a second front convex portion in the area of the forefoot defining a front zone of contact with the ground when the sole is laid flat on the ground, the front contact zone being in the form of a transverse contact strip having a width less than twenty millimeters, along the longitudinal direction X of the outer sole assembly, the center of the front contact zone being positioned in a front support zone located between 35% and 50% of the length (L2) of the upper, from the front end of the upper interface surface.

14. Outer sole assembly according to claim 1, wherein: the lower cushioning layer comprises a front lower cushioning layer and a rear lower cushioning layer, connected to one another to form a single, unitary part.

15. Sports shoe equipped with an outer sole assembly as defined in claim 1.

16. Outer sole assembly according to claim 1, wherein: the rigidity of the rigid blade is at least five times greater than the rigidity of the wing of the rigid support.

17. Outer sole assembly according to claim 1, wherein: the wing of the rigid support is made of a thermoplastic polymer, such as polyamide (PA), thermoplastic polyurethane (TPU), or a composite material comprised of a thermoplastic/thermosetting matrix (PA, TPU, epoxy, etc.) combined with fibers (glass, carbon, linen, etc.).

18. Outer sole assembly according to claim 1, wherein: the lower edge of the wing of the rigid support is spaced away from the edge of the lower face of the outer sole assembly, by a distance (Hi) always greater than five millimeters.

19. Outer sole assembly according to claim 1, wherein: the upper edge of the wing of the rigid support is spaced away from the edge of the upper surface of the outer sole assembly, by a distance (Hs) always greater than eight millimeters.

20. Outer sole assembly according to claim 1, wherein: the wing of the rigid support comprises a flange extending substantially horizontally towards the center of the sole assembly, from the lower edge of the wing.

21. Outer sole assembly according to claim 1, wherein: the cellular foam is made of a thermosetting material, an elastomeric thermoplastic material, or a mix of thermosetting and elastomeric thermoplastic materials.

22. Outer sole assembly according to claim 1, wherein: the lower cushioning layer comprises a front lower cushioning layer and a rear lower cushioning layer, distinctive from the front lower cushioning layer.

23. Outer sole assembly according to claim 1, wherein: the rigid support is in direct contact with the upper cushioning layer.

* * * * *